(12) United States Patent
Osborn et al.

(10) Patent No.: US 12,425,859 B2
(45) Date of Patent: Sep. 23, 2025

(54) ENHANCING CYBERSECURITY PROTECTION THROUGH DIVERSIFIED TRANSPORT PATHS

(71) Applicant: DISH Wireless L.L.C., Englewood, CO (US)

(72) Inventors: Stacey Osborn, Arvada, CO (US); Greg Johnston, Castle Rock, CO (US)

(73) Assignee: DISH WIRELESS, L.L.C., Englewood, CO (US)

( * ) Notice: Subject to any disclaimer, the term of this patent is extended or adjusted under 35 U.S.C. 154(b) by 320 days.

(21) Appl. No.: 18/365,029

(22) Filed: Aug. 3, 2023

(65) Prior Publication Data

US 2025/0048104 A1 Feb. 6, 2025

(51) Int. Cl.
*H04L 1/00* (2006.01)
*H04W 12/106* (2021.01)

(52) U.S. Cl.
CPC ......... *H04W 12/106* (2021.01); *H04L 1/0005* (2013.01)

(58) Field of Classification Search
CPC .................................................. H04W 12/10
See application file for complete search history.

(56) References Cited

U.S. PATENT DOCUMENTS

| 10,708,170 B2 * | 7/2020 | Sen | H04L 45/38 |
| 2007/0177579 A1 * | 8/2007 | Diethorn | H04L 47/10 370/352 |
| 2019/0173568 A1 * | 6/2019 | Jalali | H04W 16/28 |

* cited by examiner

*Primary Examiner* — Michael T Vu
(74) *Attorney, Agent, or Firm* — Capitol City TechLaw; Jasbir Singh

(57) ABSTRACT

Enhancing cybersecurity protection during data packet transportation. This involves selecting transport paths differing by a respective modality with one or more processors and associating a plurality of bins, each with a respective modality of a respective transport path. The data packets are split into packets of the bins and formatted based on the associated modality. The respective data packets of each of the bins are transported with the respective transport path of the transport paths. The count of the transport paths is greater than one.

16 Claims, 3 Drawing Sheets

ENHANCING CYBERSECURITY PROTECTION THROUGH DIVERSIFIED TRANSPORT PATHS

FIELD

The present teachings relate to the field of cybersecurity and enhance data protection during transmission. Multiple transport paths from a set of available transport paths are selected and the data packets are split into corresponding bins. The respective packets of each of the bins is formatted based on the associated modality and transported via the corresponding transport path. The transport paths are differentiated by their modality. A unique encryption hopset may be assigned for the transport paths. The data packets after transportation may be combined at a receiver. This combining may restore the original order of the data packets. The data packets may be received from a user device via a standard protocol by a secure transport device that performs the splitting, formatting, and sending.

BACKGROUND

With the rapidly changing cyber security environment, the recent increases in attacks targeting small to medium size businesses and corporations and the advances being made in the field of quantum computing there is a need for new ways to protect confidential and proprietary information, especially while in transport. Hopsets have been used as a secondary way of improving the security of transmissions on top of encryption key to protect the transmission using a single mode of transport, such as RF.

The present teachings add multiple transport modes to the concept of a hopset to decrease the likelihood of all of the necessary data bits being collected if a transport is intercepted. The multiple transports further protect the transmission and making it impossible for a bad actor to reassemble a communication even if they are able to crack the encryption key being used.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In one embodiment, the method includes enhancing cybersecurity protection during transportation of data packets. This involves selecting transport paths differing by a respective modality with one or more processors, associating a plurality of bins, each with a respective modality of a respective transport path, splitting the data packets into packets of the bins, formatting the respective packets of each of the bins based on the associated modality, and sending the respective data packets of each of the bins with the respective transport path of the transport paths. In this case, a count of the transport paths is greater than one. In some embodiments, a count of the bins equals the count of the transport paths.

In another embodiment, the modality of each of the transport paths is defined by one or more of modulation schemes, static network nodes, protocols, mediums, and encryption keys. In some embodiments, the modulation schemes include 256 QAM and 64 QAM. Additionally or alternatively, the mediums may include wired, cellular, satellite, Wi-Fi, Bluetooth, and Zigbee. In some embodiments, the static network nodes comprise a network node positioned along a respective network path to ensure traversal via a predetermined network segment for traffic of the respective network path.

In yet another embodiment, the method may include using a unique encryption hopset for the transport paths and sending the data packets using the unique encryption hopset. Additionally or alternatively, the method may include combining the data packets after the sending. In some embodiments, the combiner is configured to restore an order of the data packets or de-format the respective packets of the respective transport path by the associated modality.

In another embodiment, the data packets are transported from a user device to a secure transport device that performs the splitting and sending. In some embodiments, the user device is a portable communication device. Additionally or alternatively, the destination device may be a server or a cloud storage system. In some embodiments, the data packets are a file.

In yet another embodiment, the transport paths have different latencies. Additionally or alternatively, an unsecure portion of one of the transport paths differs with an unsecure portion of another of the transport paths by their respective modalities. In some embodiments, the formatter is configured to re-packetize the respective data packets of each of the transport paths with a header.

Additional features will be set forth in the description that follows, and in part will be apparent from the description, or may be learned by practice of what is described.

BRIEF DESCRIPTION OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
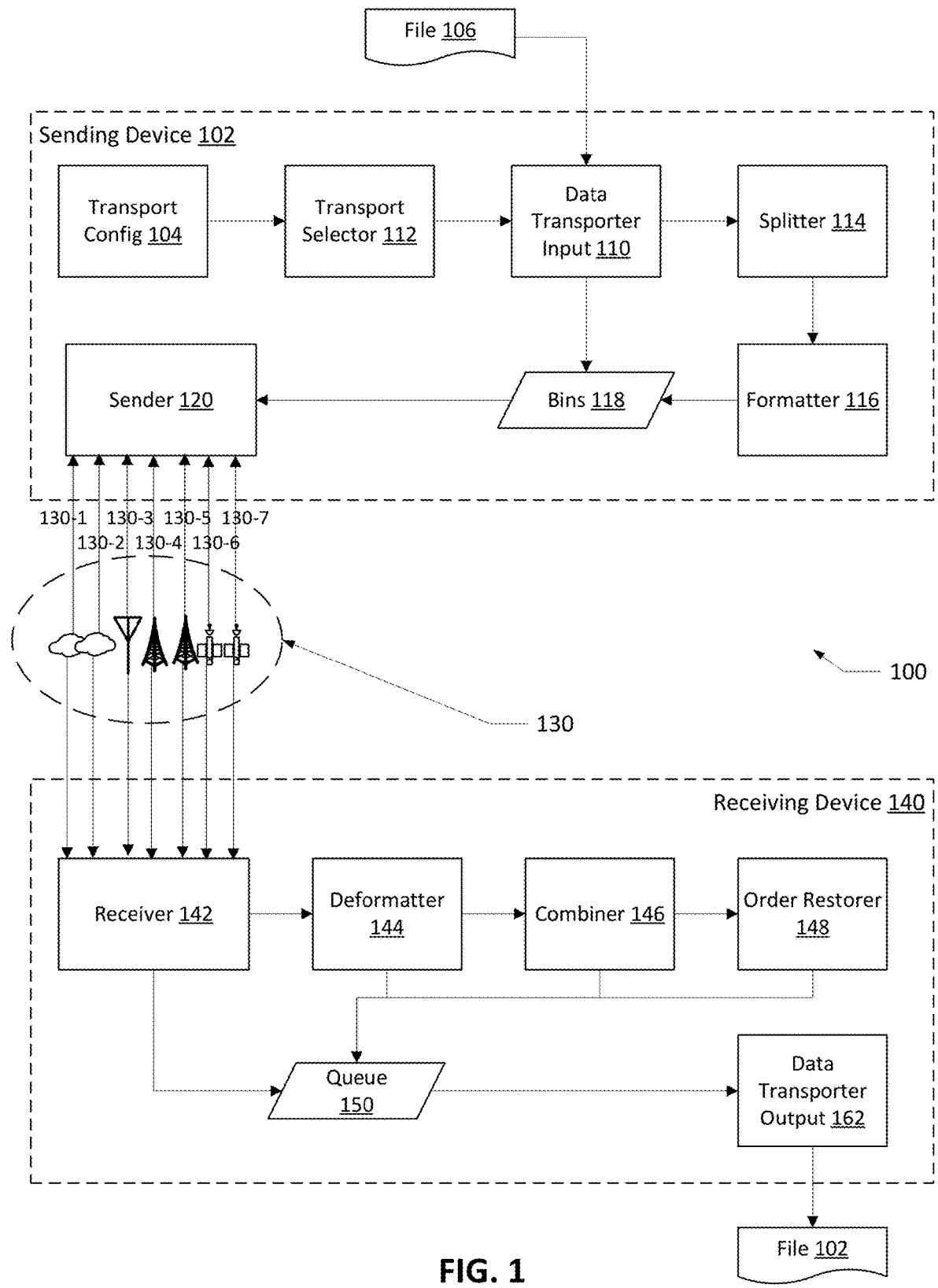
FIG. 1 illustrates a system architecture for enhancing cybersecurity protection during transportation of data packets.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically formatted device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In an example embodiment, a method for enhancing cybersecurity protection during transportation of data packets is provided. This method involves selecting transport paths differing by a respective modality with one or more processors and associating a plurality of bins, each with a respective modality of a respective transport path. The method includes splitting the data packets into packets of the bins and formatting the respective packets of each of the bins based on the associated modality. The method includes sending the respective data packets of each of the bins with the respective transport path of the transport paths. In this context, a count of the transport paths is greater than ones.

FIG. 1 illustrates a system architecture for enhancing cybersecurity protection during transportation of data packets.

A system 100 for transportation of data packets may include a sending device 102 and a receiving device 140. One or more computer processors (not shown) execute the teachings herein. The processors are responsible for selecting transport paths, associating modalities with bins, splitting data packets, formatting packets, and sending them.

Sending device 102 may be embedded in a user device such as a mobile device, a computer or the like. File 106 may a locally stored file on the user device.

In some embodiments, receiving device 140 may be included in an end device, for example, a user device, a server, or a cloud storage system.

Receiving device 140 may be a network device that forwards the data packets after combining and reordering them (if necessary) to a user device.

In some embodiments, a user device connects may connect to and request services from sending device 102 when secure transportation of data packets is desired. In such embodiments, sending device 102 is a network device that offers connectivity with standard protocols via a network connection. File 106 may be stored on the user device and received via data transporter input 110 by sending device 102.

Sending device 102 may include a transport configurator 104, a transport selector 112, a data transporter input 110, a splitter 110, a formatter 116 and a sender 120. Sending device 102 may include utilize bins 118 associated with modalities of transport paths 130 (transport path 130-1, transport path 130-2, transport path 130-3, transport path 130-4, transport path 130-5, transport path 130-6, transport path 130-7).

Transport configurator 104 may be used to configure transport paths 130 and their associated modalities. For example, transport configurator 104 may be used to define transport paths 130. Each transport path is differentiated by its unique modality. Modalities may be defined as a function of a variance in modulation schemes, static network nodes, protocols, mediums, and encryption keys used for a transport path. In some embodiments, a modality identifier may determine the modality of each transport path.

Exemplary transport paths 130 that use radio communications may use various modulation schemes such as QAM, ASPK, or the like. Exemplary transport paths 130 may differentiate network paths using static network nodes positioned along a respective network path to ensure traversal via a predetermined network segment using, for example, segment routing (SR). Exemplary transport paths 130 may use different protocols such as Internet Protocol (IP), Asynchronous transfer mode (ATM) or the like. Exemplary transport paths 130 may use various mediums such as wired, cellular, satellite, Wi-Fi, Bluetooth, Zigbee or the like. Exemplary transport paths 130 may use unique encryption hopsets for each transport path, enhancing the security of data transmission. Transport paths 130 may have different latencies and their unsecure portions may differ by their respective modalities.

In the present example, transport path 130-1 may be an IP path over a public cloud, transport path 130-2 may be an IP path over a private cloud using segment routing, transport path 130-3 may be a path over a cellular network, transport path 130-4 may be a radio network path (for example, Bluetooth media, Zigbee media, Wi-Fi or the like), transport path 130-5 may be a radio path using a modulation (for example, standard specific, QAM, ASPK), transport path 130-6 may be a satellite network path using radio frequencies in range A, and transport path 130-7 may be a satellite network path using radio frequencies in range B.

Transport selector 112 may select two or more of transport paths 130. Selection may be made based on service level agreements and the like. In some embodiments, transport selector 112 may select all transport paths 130.

Data transporter input 110 may receive data packets for transport. In some embodiments, data transporter input 110 may receive a file 106 or filename. In some embodiments, data transporter input 110 may receive a data stream. Packets of the data stream may be stored at sending device 102 until the data stream is exhausted. In some embodiments, packets of the data stream may be immediately processed and transported to receiving device 140. A combiner 146 of receiving device 140 may wait for the data stream to be exhausted at sending device 102 prior to processing.

Splitter 114 is responsible for splitting the data packets into bins 118. Each bin corresponds to a different transport path. Splitter 114 may split data packets with a random scheme, with a round robin scheme, with an interleaver or the like. This is done based on the transport paths selected, which differ by their respective modality. The modality of each transport path can be defined by factors such as modulation schemes, static network nodes, protocols, mediums, and encryption keys.

Formatter 116 is responsible for adding headers and formatting data packets based on the associated modality of the respective transport path associated with the respective bin. Formatter 116 may add a packet order field to the headers of each packet. The formatting process may involve re-packetizing the respective data packets of each of the transport paths with a header. After splitter 114 splits the data packets into packets of the bins and formatter 116 formats the respective packets of each of the bins based on the associated modality. Formatter 116 ensures the data packets are correctly prepared for transportation via their respective transport paths. The formatted packets are then ready for sending via their respective transport paths, enhancing the cybersecurity protection during their transportation.

Sender 120 is responsible for sending the respective data packets of each bin via the respective transport path. The transport paths are differentiated by their modality, and a unique encryption hopset may be assigned for the transport paths. Sender 129 may send using a unique encryption hopset assigned for the transport paths.

Receiving device 140 may include a receiver 142, a de-formatter 144, a combiner 146, an order restorer 148, a data transporter output 162 and a data store 150.

Receiver 142 manages entry points for the data packets coming from different transport paths. Each entry point corresponds to a specific transport path.

De-formatter 144 de-formats the respective packets of each transport path based on the associated modality. The decoding process may involve reversing the formatting process that was applied before transportation.

Combiner 146 combines the data packets after transportation or reception at a destination. Combiner 146 can restore the original order of the data packets with order restorer 148 and de-format the respective packets of the respective transport path by the associated modality with de-formatter 144. Combiner 146 ensures that the data packets, even when transported via different paths, can be correctly combined and de-formatted, maintaining the integrity and confidentiality of the data.

Order restorer 148 is responsible for restoring the original order of the data packets. It arranges the de-formatted packets in the sequence they were in before being split and transported.

Data transporter output 162 is where the combined data packets are outputted from the combiner. The outputted data can then be used or stored as needed.

The system architecture enhances cybersecurity during data transmission by using multiple transport paths and formatting schemes. The data packets can be transported from a user device to an intermediary device that performs the splitting and sending.

Figure 2:
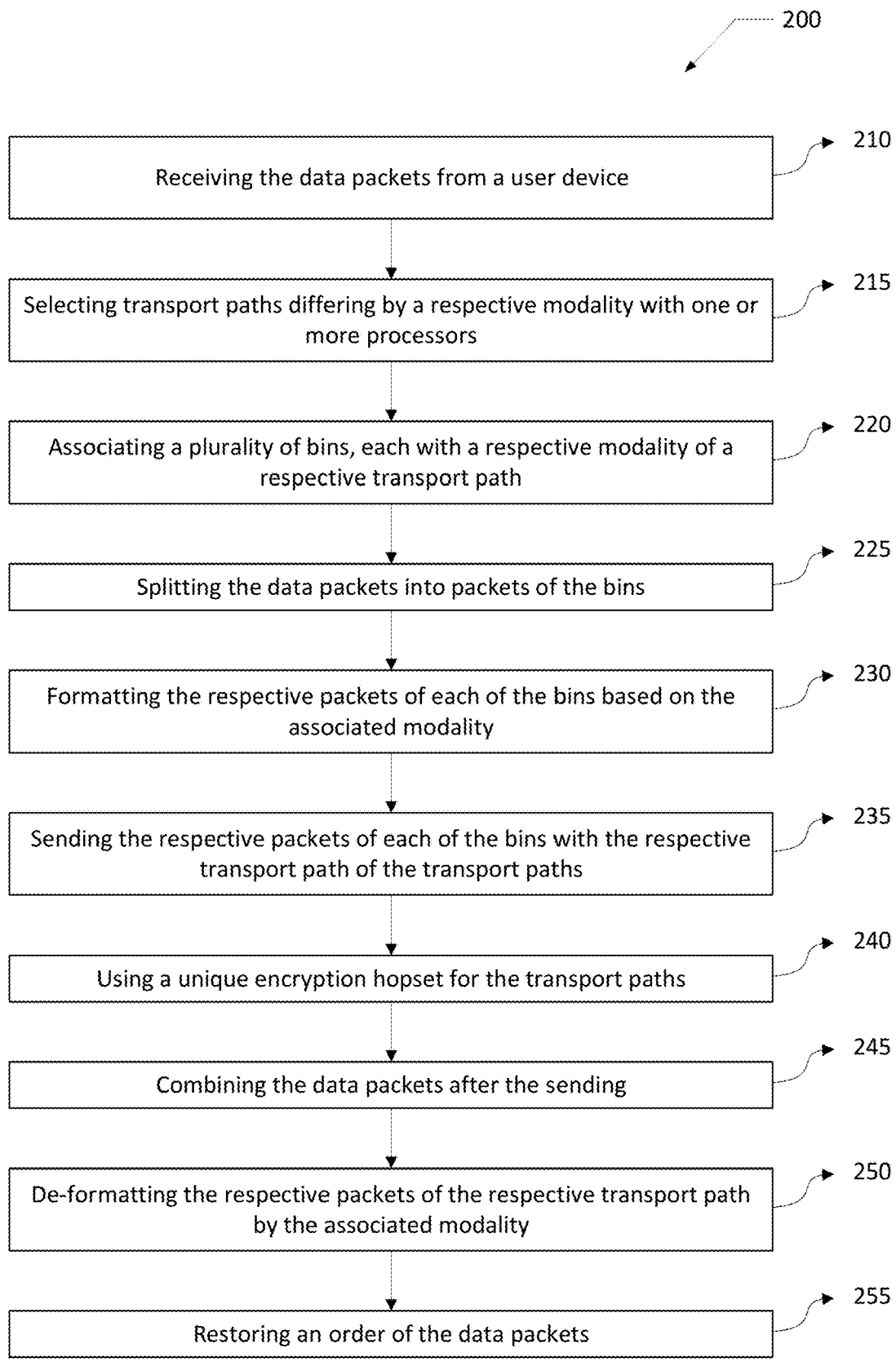
FIG. 2 is a flow diagram illustrating the method for enhancing cybersecurity protection during transportation of data packets according to various embodiments.

FIG. 2 is a flow diagram illustrating the method for enhancing cybersecurity protection during transportation of data packets according to various embodiments.

A method 200 for enhancing cybersecurity protection during transportation of data packets is provided. FIG. 2 provides a visual representation of the method for enhancing cybersecurity during data packet transportation.

Method 200 may include operation 210 for receiving the data packets from a user device, from a file, via a standard protocol at a secure transport device or the like.

Method 200 may include operation 215 for selecting transport paths differing by a respective modality with one or more processors. Operation 215 corresponds to the process of choosing multiple transport paths from a set of available paths. These paths are differentiated by their respective modality.

Method 200 may include operation 220 for associating a plurality of bins, each with a respective modality of a respective transport path. Operation 220 involves linking each transport path with a bin of data packets. Each bin is associated with a specific modality of a transport path.

Method 200 may include operation 225 for splitting the data packets into packets of the bins. Operation 225 refers to the process of dividing the data packets into the bins associated with each transport path.

Method 200 may include operation 230 for formatting the respective packets of each of the bins based on the associated modality. Operation 230 involves formatting the data packets in each bin based on the modality associated with the respective transport path.

Method 200 may include operation 235 for sending the respective packets of each of the bins with the respective transport path of the transport paths.

Method 200 may include operation 240 for using a unique encryption hopset for the transport paths.

Method 200 may include operation 245 for combining the data packets after the sending.

Method 200 may include operation 250 for de-formatting the respective packets of the respective transport path by the associated modality.

Figure 3A:
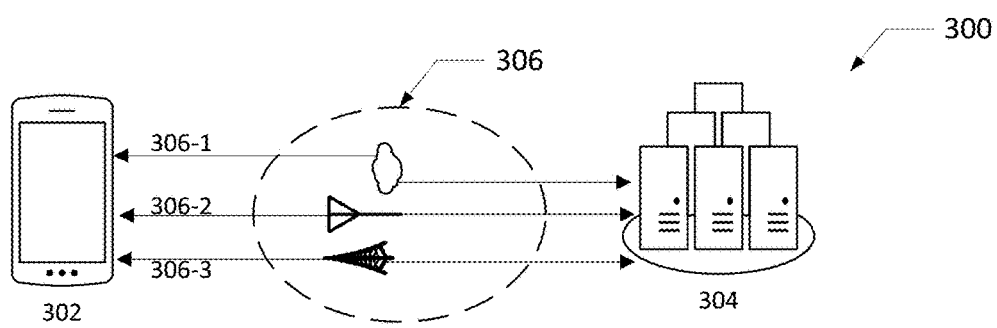
FIG. 3A illustrates a system including a user device and an on-premises data center according to various embodiments.

FIG. 3A illustrates a system including a user device and an on-premises data center according to various embodiments.

FIG. 3A illustrates a system 300 including a user device 302 and a on-premises data center 304. User device 302 may be connected to on-premises data center 304 via transport paths 306 including an on-premises private 5G network 306-1, an on-premises Bluetooth network 306-2, and a point-to-point Wi-Fi network 306-3. User device 302 could be a portable communication device. A sending device that performs the splitting and sending of data packets (such as sending device 102 of FIG. 1) may be included in user device 302. A receiving device that combines and restores an order of the data packets (such as receiving device 140 of FIG. 1) may be included in on-premises data center 304. On-premises data center 304 could be a server or a cloud storage system.

Figure 3B:
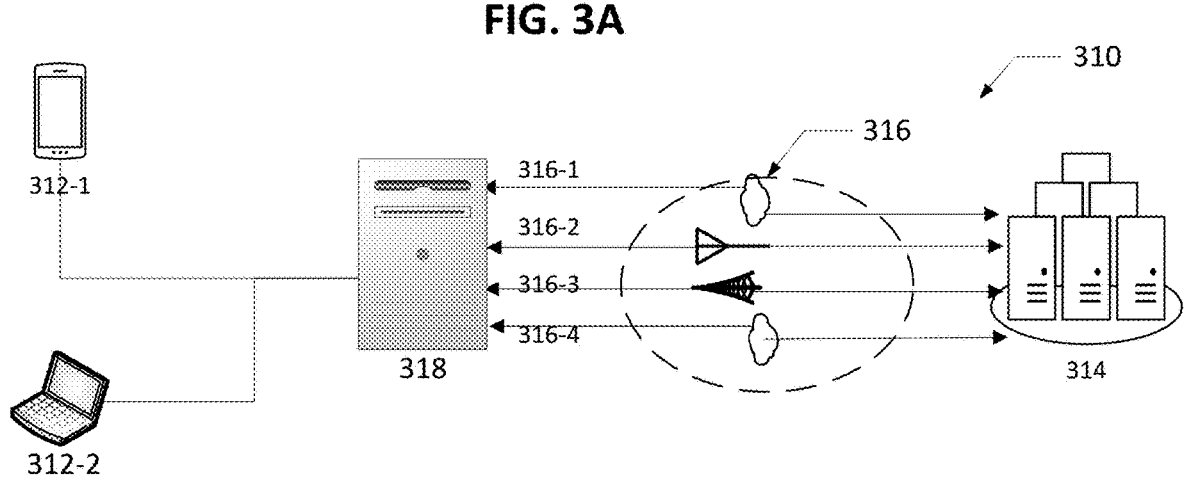
FIG. 3B illustrates a system including a user device, a secure transport device and a data center according to various embodiments.

FIG. 3B illustrates a system including a user device, a secure transport device and a data center according to various embodiments.

FIG. 3B illustrates a system 310 including a user device 312, a data center 314 and a secure transport device 318. User device 312 may be connected to a secure transport device 318 via standard protocols (such as IP protocols) and mediums (such as Wi-Fi, wired, cellular). Secure transport device 318 may connect with 314 via transport paths 316. Transport paths 316 may include a private cloud network 316-1, a cellular network 316-2, a point-to-point Wi-Fi network 316-3, and a public cloud network 316-4. User device 302 could be a portable communication device. A sending device that performs the splitting and sending of data packets (such as sending device 102 of FIG. 1) may be included in secure transport device 318. A receiving device that combines and restores an order of the data packets (such as receiving device 140 of FIG. 1) may be included in data center 314. Data center 314 could be a server or a cloud storage system. Secure transport device 318 may be a location remote from a location of data center 314.

Data center 314 represents a server or cloud storage system which acts as the destination device for the transported data packets. Data center 314 is designed to receive the data packets that have been transported via multiple transport paths, each differentiated by their respective modality. Data center 314 is equipped with the necessary hardware and software to combine the received data packets, restoring their original order.

Figure 4:
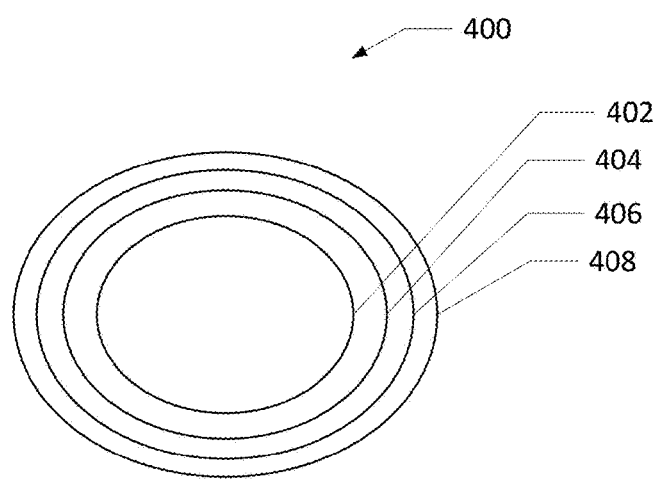
FIG. 4 illustrates data encapsulation according to various embodiments.

FIG. 4 illustrates data encapsulation according to various embodiments.

A packet 400 sent by sending device 102 and received at receiving device 140 may include plurality of headers with data 402. Data 402 may be encapsulated by a secure transport header 404, an IP header 406 and a transport medium header 408. Transport medium header 408 may include headers for each medium used to transport data 402. Formatter 116 and de-formatter 144 may be responsible for managing the headers.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for enhancing cybersecurity protection during transportation of data packets, the method comprising:
    selecting transport paths differing by a respective modality with one or more processors;
    associating a plurality of bins, each with a respective modality of a respective transport path;
    splitting the data packets into packets of the bins;
    formatting the respective packets of each of the bins based on the associated modality; and
    sending the respective packets of each of the bins with the respective transport path of the transport paths,
    wherein a count of the transport paths is greater than one.

2. The method of claim 1, wherein the modality of each of the transport paths is defined by one or more of modulation schemes, static network nodes, protocols, mediums, and encryption keys.

3. The method of claim 2, wherein the modulation schemes include 256 QAM and 64 QAM.

4. The method of claim 2, wherein the mediums comprise wired, cellular, satellite, Wi-Fi, Bluetooth, and Zigbee.

5. The method of claim 2, wherein the static network nodes comprise a network node positioned along a respective network path to ensure traversal via a predetermined network segment for traffic of the respective network path.

6. The method of claim 1, further comprising using a unique encryption hopset for the transport paths.

7. The method of claim 1, further comprising combining the data packets after the sending.

8. The method of claim 7, further comprising restoring an order of the data packets.

9. The method of claim 7, further comprising de-formatting the respective packets of the respective transport path by the associated modality.

10. The method of claim 1, further comprising receiving the data packets from a user device via a standard protocol at a secure transport device that performs the splitting, the formatting, and the sending.

11. The method of claim 10, wherein the user device is a portable communication device.

12. The method of claim 10, wherein the data packets are transported to a server or a cloud storage system.

13. The method of claim 1, wherein the data packets are a file.

14. The method of claim 1, wherein the transport paths have different latencies.

15. The method of claim 1, wherein an unsecure portion of one of the transport paths differs with an unsecure portion of another of the transport paths by their respective modalities.

16. The method of claim 1, wherein the formatter is configured to re-packetize the respective packets of each of the transport paths with a header.

* * * * *